United States Patent
Pagani et al.

(10) Patent No.: US 9,219,552 B2
(45) Date of Patent: Dec. 22, 2015

(54) NOISE LIMITATION FOR TRANSMISSION IN A MULTI-PATH CHANNEL

(75) Inventors: Pascal Pagani, Guingamp (FR); Rehan Hashmat, Valbonne (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 13/876,396

(22) PCT Filed: Sep. 30, 2011

(86) PCT No.: PCT/FR2011/052282
§ 371 (c)(1),
(2), (4) Date: Jul. 12, 2013

(87) PCT Pub. No.: WO2012/042182
PCT Pub. Date: Apr. 5, 2012

(65) Prior Publication Data
US 2013/0279612 A1 Oct. 24, 2013

(30) Foreign Application Priority Data

Sep. 30, 2010 (FR) ...................... 10 57924

(51) Int. Cl.
| | |
|---|---|
| H04L 27/00 | (2006.01) |
| H04B 15/00 | (2006.01) |
| H04B 3/54 | (2006.01) |
| H04L 25/02 | (2006.01) |
| H04B 7/04 | (2006.01) |
| H04L 25/03 | (2006.01) |

(52) U.S. Cl.
CPC ................ *H04B 15/00* (2013.01); *H04B 3/542* (2013.01); *H04L 25/0248* (2013.01); *H04L 25/03343* (2013.01); *H04B 7/0413* (2013.01); *H04L 25/03299* (2013.01); *H04L 2025/03426* (2013.01)

(58) Field of Classification Search
CPC ............. G06K 9/6243; G10L 21/0272; H01Q 21/062; H01Q 21/24
USPC ........................................................ 375/259
See application file for complete search history.

(56) References Cited

U.S. PATENT DOCUMENTS

| | | | |
|---|---|---|---|
| 6,141,337 A * | 10/2000 | Uta et al. ...................... | 370/350 |
| 2004/0139137 A1 | 7/2004 | Mailaender et al. | |
| 2010/0106269 A1* | 4/2010 | Garudadri et al. ............. | 700/94 |
| 2012/0190389 A1* | 7/2012 | Hui ............................... | 455/500 |

FOREIGN PATENT DOCUMENTS

EP 1956718 A1 8/2008

OTHER PUBLICATIONS

Tuncer Baykas, Mohamed Siala, Abbas Yogacoglu, Generalized decorrelating discrete time rake receiver, Dec. 2007.*
Noriyuki Maeda, Hiroyuki Atarashi, Sadayuki Abeta and Mamoru Sawahashi, Throughput Comparison between VSF-OFCDM and OFDM considering Effect of Sectorization in Forward Link Broadband Packet Wireless Access, IEEE 2002.*

(Continued)

*Primary Examiner* — Tanmay Shah
(74) *Attorney, Agent, or Firm* — David D. Brush; Westman, Champlin & Koehler P.A.

(57) ABSTRACT

A method is provided for limiting noise in a plurality of signals received in a multiple input receiver. The method includes a processing operation for decorrelating of the noise present in the signals received.

10 Claims, 2 Drawing Sheets

(56) References Cited

OTHER PUBLICATIONS

Baykas et al., "Generalized Decorrelating Discrete-Time Rake Receiver", IEEE Transactions on Wireless Communications, IEEE Service Center, Piscataway, NJ, US, vol. 6, No. 12, Dec. 1, 2007, pp. 4268-4274, XP011198722.

Maeda N. et al., "Throughput Comparison Between VSF-OFCDM and OFDM Considering Effect of Sectorization in Forward Link Broadband Packet Wireless Access", VTC 2002-Fall. 2002 IEEE 56th Vehicular Technology Conference Proceedings, Vancouver, Canada, Sep. 24-28, 2002; IEEE Vehicular Technology Conference, New York, NY: IEEE, US, vol. 1, Sep. 24, 2002, pp. 47-51, XP010608514.

Burg A. et al., "Performance of MIMO-Extended UMTS-FDD Downlonk Comparing Space-Time Rake and Linear Equalizer" Vehicular Technology Technology Conference, 2003. VTC 2003-Fall. 2003 IEEE 58th Orlando, FL, US, Oct. 6, 2003, pp. 473-477vol. 1, XP010701001.

Leandro D'Orazio et al., "An Adaptive Minimum-BER Approach for Multi-User Detection in STBC-MIMO MC-CDMA Systems", Global Telecommunication Conference, 2007. Globecom '07. IEEE, IEEE, Piscataway, NJ, USA, Nov. 1, 2007, pp. 3427-3431, XP031196578.

International Search Report and Written Opinion dated Dec. 7, 2011 for corresponding International Application No. PCT/FR2011/052282, filed Sep. 30, 2011.

Marousis A. et al, Adaptative Turbo Code-Multiplexed Pilot Channel Estimation for MIMO MC-CDMA Systems in Highly Time-Variant Propagation Channels, School of Electrical and Computer Engineering, National Technical University of Athens 9 Heroon Polytechniou sir., Athens, Greece.

Giovaneli et al., Improved Space-Time Coding Applications for Power Line Channels, 7th International Symposium on Power-Line Communications and its Applications, Kyoto, Japan, Mar. 26-28, 2003.

Hashmat et al., MIMO Capacity of Inhome PLC Links up to 100 MHz, Third Workshop on Power Line Communications, Oct. 1-2, 2009, Udine, Italy.

\* cited by examiner

NOISE LIMITATION FOR TRANSMISSION IN A MULTI-PATH CHANNEL

CROSS-REFERENCE TO RELATED APPLICATIONS

This Application is a Section 371 National Stage Application of International Application No. PCT/FR2011/052282, filed Sep. 30, 2011, which is incorporated by reference in its entirety and published as WO 2012/042182 on Apr. 5, 2012, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of data transmission. There can be considered to be two major categories of communications: wired communications and wireless communications.

BACKGROUND OF THE DISCLOSURE

In most cases, the transmission channel between a transmitter and a receiver has a limited capacity and generates attenuations and multipath propagation. It is therefore necessary to optimize the processing of the signal in order to increase throughput and quality of service.

The technique called MIMO (Multiple Input Multiple Output) is well known in wireless communications for increasing channel capacity, in the presence of multipath propagation. Several reception and/or transmission antennas are used, so as to exploit the spatial diversity generated by the multiple propagation paths.

More recently, the MIMO technique has been extended to wired communications, in particular for PLC (Power Line Communication) systems.

For example, the article by Giovaneli, Honary and Farrell entitled "Improved space time coding applications for PLC channels", International Symposium on Power Line Communications and its applications, 2003, is dedicated to four-wire three-phase electrical networks.

The gain in terms of channel capacity is set out for example in "MIMO capacity of inhome PLC links up to 100 MHz", IEEE WSPLC 2009, by Hasmat and Pagani.

In a MIMO type system, each receiving sensor is affected by noise, thereby corrupting the transmitted data.

In a wireless system, the various reception antennas are not physically connected, and are located at a distance from one another to benefit from spatial diversity. Thus, the noise signals received on the reception antennas are independent and uncorrelated.

Since the MIMO technique for a wired system is closely derived from that for a wireless system, it is generally considered that the noise signals received on the various reception sensors are also independent and uncorrelated in a wired system. The signal processing methods in the wired systems are therefore based on the hypothesis of independent and uncorrelated noise and no method has been developed to limit the effects of correlated noise in a MIMO system.

Nevertheless, the inventors have observed by laboratory-made measurements that the noise signals received on the various reception sensors are highly correlated in a wired MIMO system.

The result of this is that the conventional methods for increasing channel capacity in a MIMO system are not optimal since they are based on a false hypothesis.

SUMMARY

An exemplary embodiment of the present disclosure relates to a method for limiting noise in a plurality of signals received in a multi-reception receiver, implementing a step for decorrelating noise present in the received signals.

By virtue of an embodiment of the invention, the noise present in the received signals exhibits uncorrelated statistics. Thus, the noise is limited in reception.

Such a decorrelation step includes a multiplication of the noise by coefficients varying with time or with frequency, or with time and frequency.

Thus, the decorrelation is implemented by relatively simple calculations.

According to a preferred feature, the coefficients are dependent on a phase varying according to a predefined sequence.

Here also, the calculations are relatively simple.

According to a preferred feature, states of phases are defined in a predetermined number and the phase of each coefficient is determined by a pseudorandom sequence generator.

An embodiment of the invention relates also to a method for receiving a plurality of signals in a multi-reception receiver, characterized in that it includes the noise limiting method described previously.

The reception method takes advantage of the decorrelation of the noise signals, since it brings about their limiting.

An embodiment of the invention further relates to a method for transmitting at least one signal to be transmitted by a transmitter and intended to be received in a multi-reception receiver. According to an embodiment of the invention, such a transmission method includes a step for preprocessing the at least one signal to be transmitted, which has the effect of making transparent the effect, on a useful part of the received signals, of a processing operation carried out during reception to decorrelate the noise present in the received signals.

Thus, the useful part of the signals is not affected by the processing for limiting noise. Upon reception, the useful information from the transmitted signals is therefore found.

This processing is of course related to that carried out upon reception.

This preprocessing step includes a multiplication of the at least one signal to be transmitted by coefficients varying with time or with frequency, or with time and frequency. This processing is implemented by relatively simple calculations.

According to a preferred feature, the coefficients are dependent on a phase varying according to a predefined sequence.

According to a preferred feature, states of phases are defined in a predetermined number and the phase of each coefficient is determined by a pseudorandom sequence generator.

An embodiment of the invention relates also to a multi-reception receiver, able to receive a plurality of signals, characterized in that it includes means for decorrelating noise present in the received signals.

An embodiment of the invention relates also to a transmitter of at least one signal to be transmitted toward a multi-reception receiver able to receive a plurality of signals, characterized in that it includes means for preprocessing the at least one signal to be transmitted, which provide for making transparent the effect, on a useful part of the received signals, of a processing operation carried out during reception to decorrelate the noise present in the received signals.

These various items of equipment exhibit advantages similar to those of the previously described methods.

In one particular embodiment, the various steps of the methods according to the invention are determined by computer program instructions.

Consequently, another objective of an embodiment of the invention is a computer program on a data medium, this program being capable of being run in a computer, this program including instructions suitable for implementing steps of a method as described above.

This program can use any programming language and be in the form of source code, object code or a code intermediate between source code and object code, such as in a partially compiled form or in any other desirable form.

Another objective of an embodiment of the invention is a data medium readable by a computer, and including computer program instructions as mentioned above.

The data medium can be any entity or device capable of storing the program. For example, the medium can include a means of storage such as a ROM, for example a CD-ROM or a microelectronic circuit ROM, or a magnetic recording means, for example a floppy disk or a hard disk.

On the other hand, the data medium can be a transmittable medium such as an electrical or optical signal, which can be conveyed via an electrical or optical cable, via radio or via other means. The program according to an embodiment of the invention can in particular be downloaded over an Internet type network.

Alternatively, the data medium can be an integrated circuit in which the program is incorporated, the circuit being adapted to execute or to be used in the execution of the method in question.

BRIEF DESCRIPTION OF THE DRAWINGS

Other features and advantages will become clearer upon the reading about preferred embodiments described with reference to the drawings in which.

DETAILED DESCRIPTION OF ILLUSTRATIVE EMBODIMENTS

Figure 1:
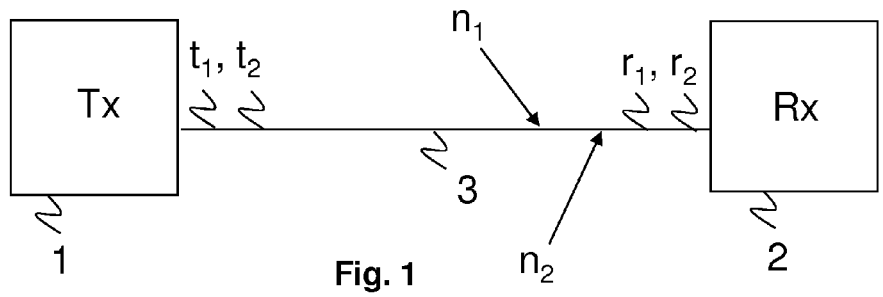
FIG. 1 represents an embodiment of devices according to the invention.

According to one embodiment of the invention represented in FIG. 1, the items of equipment implementing the invention are a MIMO type transmitter 1 and a MIMO type receiver 2. The transmitter 1 and the receiver 2 are linked by a transmission channel 3.

The transmitter 1 includes at least one transmission port and transmits at least one signal intended for the receiver, via the transmission channel 3.

The receiver 2 includes a plurality of reception ports and receives a signal on each reception port.

The transmitter and receiver have a conventional hardware structure, and include calculation modules implemented in the form of processors and memories, as well as signal transmission and reception modules.

In the preferred embodiment, the transmission channel 3 is a wired channel. It can be a coaxial cable, a telephone transmission line or a PLC type link. An embodiment of the invention is particularly advantageous in this case, but it nevertheless applies to any type of transmission channel, wired or wireless. The transmission channel includes multiple paths between the at least one transmission port and the plurality of reception ports.

According to an embodiment of the invention, the signals received on each port of the receiver 2 are postprocessed in order to change the statistical characteristics of the received noise.

Furthermore, the signals transmitted by the transmitter are preprocessed in order to cancel the effect of the postprocessing on the useful part of the signal.

Hereinafter, it is assumed that the transmitter transmits two signals $t_1$ and $t_2$ over two channels and the receiver receives two signals $r_1$ and $r_2$ on two reception ports. The received signals contain noise, and the noise components $n_1$ and $n_2$ are correlated. All the signals in question are variable with time. All the processing operations are preferably carried out numerically, on signals sampled beforehand.

Figure 2:
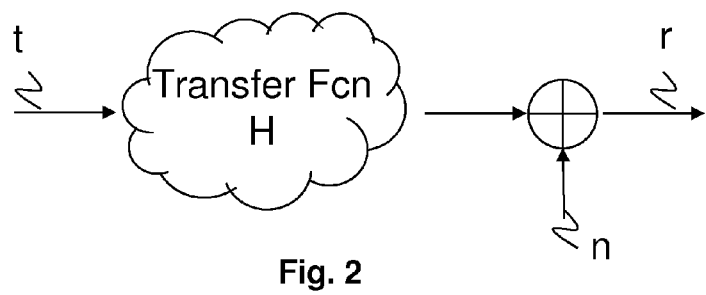
FIG. 2 is a schematic representation of a MIMO system, according to the prior art.

With reference to FIG. 2, the MIMO system is represented schematically.

t denotes the column vector of the transmitted signals, r the column vector of the received signals and n the column vector of the noise signals.

Each channel between a port of the transmitter and a port of the receiver can be represented by a transfer function. Thus, the channel between a first transmission port and a first reception port is denoted by $h_{11}$, the channel between a first transmission port and a second reception port is denoted by $h_{12}$ and so on. There are as many transfer functions as there are pairs of transmission and reception ports. In the example chosen, there are four transfer functions.

H denotes the matrix of transfer functions between transmission port and reception port. In the example chosen, H is a square matrix of 2×2 coefficients.

$$H = \begin{pmatrix} h_{11} & h_{21} \\ h_{12} & h_{22} \end{pmatrix}$$

The relationship between the signals transmitted and the signals received in the MIMO system is therefore:

$$r = Ht + n$$

Figure 3:
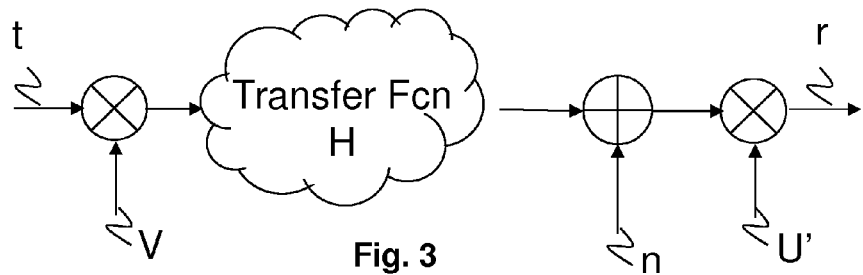
FIG. 3 is a schematic representation of a MIMO system with eigen beamforming processing, according to the prior art.

FIG. 3 represents a conventional application of the theory called "eigen beamforming" to the MIMO system. This theory provides for beam formation according to the specific modes of the channel.

This theory teaches that in order to maximize the output, signals can be transmitted in parallel, provided that the matrix H is conditioned to provide two independent channels.

This is carried out by applying a Singular Value Decomposition (SVD). This produces three matrices U, D and V such that the relationship H=UDV' is true.

The matrices U and V are unitary matrices, D is a diagonal matrix and V' is the conjugate transposed matrix of the matrix V.

First the preprocessing matrix V is applied to the transmitted signal and the postprocessing matrix U' to the received signal, giving the formula:

$$r=U'HVt+U'n=Dt+U'n$$

For convenience, the notations t and r are retained as generic variables which represent the transmitted and received signals respectively. Nevertheless, there is no equality between these variables before and after the processing in FIG. 3.

It is to be noted that the useful part of the signal Dt provides for the transmission of two independent signals. The received noise has been changed from n to U'n.

Figure 4:
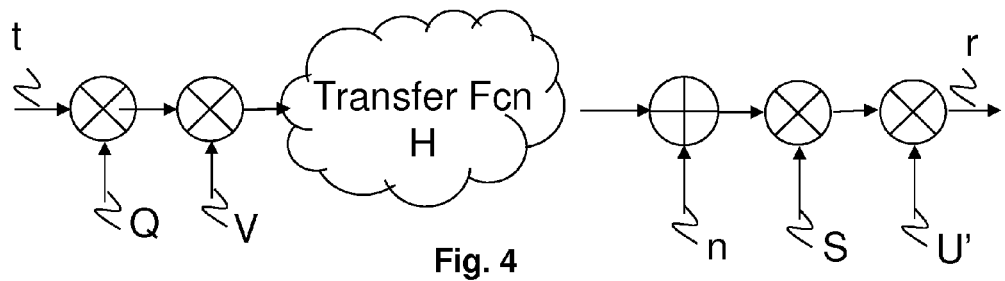
FIG. 4 is a schematic representation of a MIMO system according to an embodiment of the invention.

With reference to FIG. 4, lastly a matrix S is applied at reception and a matrix Q at transmission.

The objective of the matrix S is to limit the effect of correlated noise. It provides a decorrelation of the noise signals.

Preferably, the matrix S varies with time or with frequency, or with time and frequency, for example as a function of a phase $\phi$ which varies in the interval $[-\pi, \pi]$ at each time-domain and/or frequency-domain sample.

$$S = \begin{pmatrix} 1 & 0 \\ 0 & e^{i\phi} \end{pmatrix}$$

The phase can vary according to a known predefined sequence of the transmitter. For example, a fixed number of phase states is predefined, each state being selected by a pseudorandom sequence generator which can be implemented in the form of a shift register.

Thus, the noise signals after multiplication by the matrix S exhibit uncorrelated statistics.

The decorrelation of the noise has the direct consequence of limiting it. Specifically, it has been seen earlier that at the end of the previous processing (eigen beamforming), the received noise was changed from n to U'n. In the example of the noise n including two components, if these are correlated, one of the components of the noise U'n will have an increased power level while the other will have a reduced power level.

If additional noise at the receiver is taken into account, such as quantization noise or the noise from the reception components, then overall the power of the noise will increase, since the component of the noise U'n which will have become weaker will be drowned in the additional noise of the receiver.

However, by virtue of an embodiment of the invention, the noise signals are decorrelated. Thus, the eigen beamforming processing will not have an impact on the power level of the noise. Consequently, the increase in noise, which would have existed without the decorrelation, is avoided.

The matrix Q used at the transmission has the objective of pre-compensating for the effect of the matrix S on the useful signal.

The received signal is given by the formula:

$$r=U'SHVQt+U'Sn$$

As previously, the notations t and r are retained as generic variables which represent the transmitted and received signals respectively. Nevertheless, there is no equality between these variables before and after the processing in FIG. 4.

The matrix Q is of the form:

$$Q=D^{-1}U'S^{-1}UD$$

where $D^{-1}$ and $S^{-1}$ are the inverse matrices of D and S respectively. It is therefore necessary for the matrix S to be invertible, which is actually the case for the example matrix S given earlier.

It is recalled that D is a diagonal matrix; the calculation of its inverse is therefore immediate.

In the end, we have:

$$r=Dt+U'Sn$$

Therefore a decorrelation of the noise signals at reception is obtained, without affecting the transmitted useful signal(s).

Figure 5:
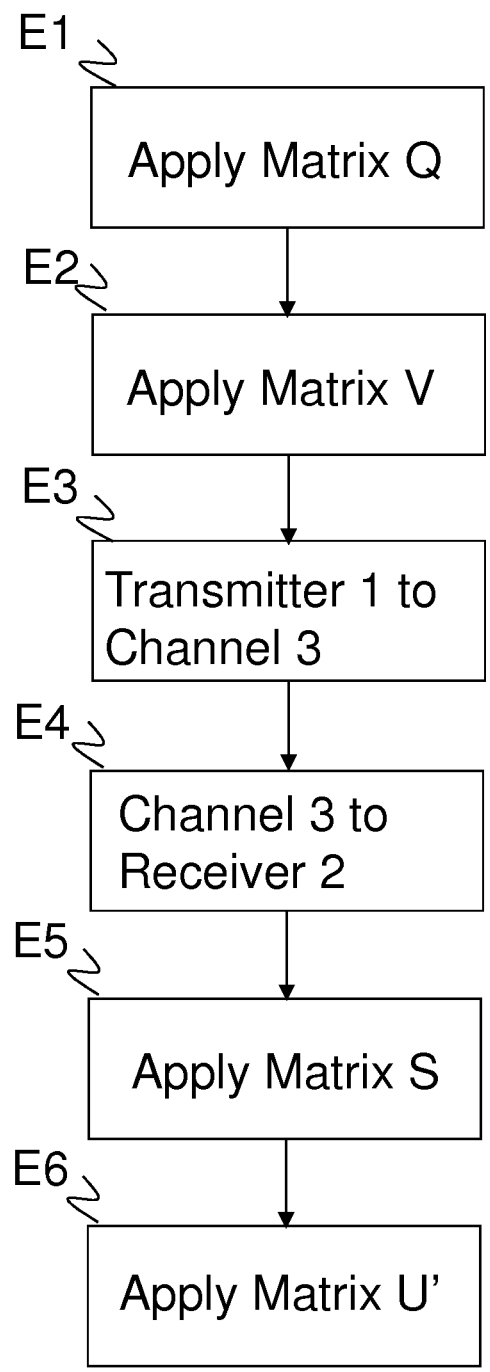
FIG. 5 represents an embodiment of transmission and reception methods according to the invention.

FIG. 5 represents the transmission and reception methods according to an embodiment of the invention. The same notations as earlier are retained.

Steps E1 to E3 are carried out in the transmitter 1.

Step E1 is the preprocessing of the signal or signals t to be transmitted. The preprocessing includes the application of the previously-described matrix Q to the signal or signals t.

The next step E2 is the eigen beamforming processing by application of the matrix V to the preprocessed signal or signals.

It is to be noted that in practice, once the matrices Q and V are calculated, the product VQ can be calculated directly, denoted for example by W. In that case, steps E1 and E2 are combined into a single step, which is the application of the matrix W.

The next step E3 is the actual transmission, which is conventional and will not be detailed here.

The next steps are carried out in the receiver 2.

Step E4 is the reception of signals on the various reception ports of the receiver.

The next step E5 is the postprocessing of signals received by application of matrix S.

The next step E6 is the eigen beamforming processing by application of the matrix U' to the postprocessed signals.

Here also, the product U'S can be calculated directly, denoted for example by Y. In that case, steps E5 and E6 are combined into a single step, which is the application of the matrix Y.

By virtue of the application of the matrix S, the noise signals at reception are decorrelated. As seen previously, this decorrelation has the direct effect of avoiding a noise increase inherent to the processing operations carried out and consequently an embodiment of the invention provides for a limiting of the noise at reception.

Although the present disclosure has been described with reference to one or more examples, workers skilled in the art will recognize that changes may be made in form and detail without departing from the scope of the disclosure and/or the appended claims.

The invention claimed is:

1. A method of limiting noise in a plurality of signals transmitted on a transmission channel, comprising:
preprocessing the plurality of signals, said preprocessing including multiplying said signals with first coefficients;
receiving from the transmission channel the plurality of preprocessed signals in a multi-reception receiver having a plurality of reception ports, each reception port receiving one of the plurality of preprocessed signals,
decorrelating the noise present in the received signals by the receiver, wherein decorrelating comprises multiplying the noise by second coefficients varying with time or with frequency, or with time and frequency; and
wherein said first coefficients are linked with said second coefficients in order to pre-compensate for an effect of said second coefficients on a useful part of the received signals.

2. The method as claimed in claim 1, wherein the second coefficients are dependent on a phase varying according to a predefined sequence.

3. The method as claimed in claim 2, wherein states of phases are defined in a predetermined number and the phase of each second coefficient is determined by a pseudorandom sequence generator.

4. A method comprising:
preprocessing at least one signal to be transmitted on a transmission channel by a transmitter, said preprocessing including a multiplication of the at least one signal in the transmitter by first coefficients varying with time or with frequency, or with time and frequency;
transmitting the at least one signal after said preprocessing step from the transmitter to a multi-reception receiver via the transmission channel, the multi-reception receiver having a plurality of reception ports configured to receive a plurality of signals, each reception port receiving one of the plurality of signals; and
wherein said first coefficients are linked with second coefficients, which are multiplied with the at least one signal in the multi-reception receiver in order to decorrelate the noise present in the at least one signal, so that the first coefficients pre-compensate for an effect of said second coefficients on a useful part of received signals.

5. The method as claimed in claim 4, wherein the second coefficients are dependent on a phase varying according to a predefined sequence.

6. The method as claimed in claim 5, wherein states of phases are defined in a predetermined number and the phase of each second coefficient is determined by a pseudorandom sequence generator.

7. A multi-reception receiver comprising:
a plurality of reception ports for receiving a plurality of signals from a transmission channel, each reception port receiving one of the plurality of signals, the received signals having been preprocessed before transmission on the transmission channel by multiplying said signals by first coefficients; and
means for decorrelating noise present in the received signals, said decorrelation means including means for multiplying the noise by second coefficients varying with time or with frequency, or with time and frequency, wherein said second coefficients are linked with said first coefficients so that the received signals are pre-compensated for an effect of said second coefficients on a useful part of received signals.

8. A transmitter comprising:
means for transmitting at least one signal to be transmitted toward a multi-reception receiver able to receive a plurality of signals via a transmission channel, the multi-reception receiver having a plurality of reception ports, each reception port receiving one of the plurality of signals, and means for preprocessing the at least one signal to be transmitted, said means for preprocessing including means for multiplying the at least one signal to be transmitted by first coefficients varying with time or with frequency, or with time and frequency, wherein said first coefficients are linked with second coefficients, which are multiplied with the at least one signal in the multi-reception receiver in order to decorrelate the noise present in the at least one signal, so that the first coefficient pre-compensate for an effect of said second coefficients on a useful part of the at least one signal received by the multi-reception receiver.

9. A non-transmittable recording medium readable by a computer on which there is recorded a computer program comprising instructions for execution of a method of limiting noise in a plurality of signals, when the instructions are executed, the method comprising:
receiving from a transmission channel the plurality of signals in a multi-reception receiver having a plurality of reception ports, each reception port receiving one of the plurality of signals, the received signals having been preprocessed before transmission on the transmission channel by multiplying said signals by first coefficients; and
decorrelating the noise present in the received signals by the receiver, wherein decorrelating comprises multiplying the noise by second coefficients varying with time or with frequency, or with time and frequency, wherein said second coefficients are linked with said first coefficients so that the received signals are pre-compensated for an effect of said second coefficients on a useful part of received signals.

10. A non-transmittable recording medium readable by a computer on which there is recorded a computer program comprising instructions for execution of a method of preprocessing at least one signal to be transmitted by a transmitter, when the instructions are executed, the method comprising:
preprocessing the at least one signal by multiplying the at least one signal in the transmitter by first coefficients varying with time or with frequency, or with time and frequency, and
transmitting the at least one signal after said preprocessing step from the transmitter to a multi-reception receiver via a transmission channel, the multi-reception receiver having a plurality of reception ports configured to receive a plurality of signals, each reception port receiving one of the plurality of signals, wherein said first coefficients are linked with second coefficients, which are multiplied with the at least one signal in the multi-reception receiver in order to decorrelate the noise present in the at least one signal, so that the first coefficient pre-compensate for an effect of said second coefficients on a useful part of the at least one signal received by the multi-reception receiver.

* * * * *